UNITED STATES PATENT OFFICE.

WILLIAM CLELAND, OF LIVERPOOL, ENGLAND.

TREATING AND UTILIZING OXIDES OF IRON FROM GAS-PURIFIERS.

Specification forming part of Letters Patent No. 42,898, dated May 24, 1864.

*To all whom it may concern:*

Be it known that I, WILLIAM CLELAND, of Liverpool, in the county of Lancaster, England, have invented a new and useful Improvement in Treating and Utilizing Oxides of Iron which have been used for Purifying Gas; and I do hereby declare that the following is a full and exact description, to wit:

My invention relates to the treatment and utilization of oxides of iron, both natural and artificial, which have been used for purifying gas distilled from coal, cannel, and other carbonaceous minerals; and it consists in converting such oxides into sulphide or sulphuret of iron by heating them in a closed vessel or chamber without access of air. This causes the sulphur contained in the material to combine chemically with the iron of the oxide and form sulphide or sulphuret of iron. A temperature of 600° to 800° Fahrenheit answers well; but I prefer a dull red heat, although still higher heats may be used.

To enable others acquainted with such subjects to carry my invention into practical effect, I will now proceed to set forth the manner of performing the same.

I take the said oxides of iron and place them in a vessel or retort, preferably of cast-iron, which may be somewhat similar to those used for the distillation of coal or cannel in gas-works. I then apply heat, and when a temperature such as is above mentioned is attained the sulphur which has been taken from the gas combines with the iron of the oxide and forms a substance or substances which I call and believe to be "sulphide" or "sulphuret" of iron. I do not, however, vouch for the scientific accuracy of these terms, and, indeed, it is unnecessary, as the said substance or substances are suitable for the purposes hereinafter mentioned. Of course if the said oxides do not contain sufficient sulphur the conversion into sulphide or sulphuret will be only partial. If, on the other hand, there is an excess of sulphur, that excess will be given off in the form of gas or vapor, and the free sulphur contained in the said gas or vapor can be condensed in the mouth-piece, or in any other suitable cooling apparatus or chamber communicating with the retort. To produce "rough sulphur," "roll-sulphur," or "flowers of sulphur", or to utilize such excess of sulphur, I add to the said oxide, previous to heating it, a quantity of oxide of iron, preferably hydrated peroxide, or a quantity of metallic iron finely divided, equivalent in some measure to the excess of sulphur, to obtain the maximum yield of such sulphide or sulphuret. The more completely the air has been excluded the more complete will be the conversion of the oxides into sulphide or sulphuret.

As the sulphide or sulphuret obtained according to my invention is a new manufacture, I would here point out some of the purposes to which it may be applied; but before doing so I may state that the said oxides usually contain ammonia, which, in the above-described process, is driven off when heat is applied, and to utilize this ammonia it may be led into a vessel containing sulphuric or other suitable acid to form ammoniacal salt; or it (the said ammonia) may be fixed by being passed into sulphates of iron produced as hereinafter mentioned. The said sulphide or sulphuret may be converted into sulphates of iron by being quenched with water as it is withdrawn from the retort, and by exposure—say in heaps—to the action of the atmosphere or oxygen, with or without the application of moderate heat and agitation. This treatment causes the sulphide to combine with oxygen and form sulphates of iron. It is better, however, that the oxidation should not be allowed to proceed so rapidly as to cause ignition, and to prevent this it should be occasionally damped with water and turned over. These crude sulphates of iron, obtained in the manner described, may be converted into green copperas by dissolving them in water and neutralizing any excess of acid by metallic iron, and then evaporating the solution until it deposits crystals of copperas. Again, such crude sulphates of iron may be used for the joint production of sulphate of ammonia and oxide of iron by treating them with the common ammonia-liquor of gas-works, or with ammonia in any other available form, crystalline sulphate of ammonia being obtained from this mixture by the usual means of lixiviation, evaporation, and crystallization. The residual compounds of iron, on being partially dried and exposed to the air, are reconverted into oxide of iron, suitable for purifying gas.

Another mode of utilizing the said sulphide or sulphuret, the sulphates of iron obtained therefrom, and other compounds of iron produced in the process of obtaining sulphate of ammonia, consists in making pigments by stirring and heating or burning these materials, preferably in an oven or reverberatory furnace, and thereafter grinding, sifting, elutriating, or otherwise finely pulverizing and washing them.

I may likewise apply the said sulphide or sulphuret to the production of sulphate of alumina by heating it or allowing it to heat (mixed with alumina) in the presence of air, and dissolving out the sulphate of alumina thus formed, the process being substantially the same as in the ordinary manufacture of sulphate of alumina from the minerals well known as alum-shale, alum-schist, and alum-slate.

Sulphate of soda may also be produced from the said sulphide or sulphuret, and also from the said sulphate of iron, by mixing them, or either of them, with common salt, and heating and stirring the mixture in the presence of air, preferably in a reverberatory furnace, whereby a mixture of sulphate of soda and oxide of iron is obtained, which yields "salt cake" and crystalline sulphate of soda by the common means of lixiviation and evaporation.

Although I have herein set forth various modes of using or applying the said sulphide or sulphuret, I only claim and desire to secure by Letters Patent—

Producing from oxides of iron that have been used for purifying gas sulphide or sulphuret of iron by heating the said oxides substantially in the manner described.

Signed and sealed by the said WILLIAM CLELAND, at Liverpool, aforesaid, this 29th day of January, A. D., 1864.

WILLIAM CLELAND. [L. S.]

Before us:
JOHN MORRISON KING,
  *Of 4 Clayton Square, Liverpool.*
JOHN DAVIES,
  *His Clerk.*